US012444861B2

United States Patent

(12) United States Patent
Freire Vieira et al.

(10) Patent No.: US 12,444,861 B2
(45) Date of Patent: Oct. 14, 2025

(54) PIERCING CONNECTOR

(71) Applicant: KRJ— INDÚSTRIA E COMÉRCIO LTDA, São Paulo (BR)

(72) Inventors: João Augusto Freire Vieira, Valinhos (BR); Alexandre Martinez Soriano, Pedra Bela (BR)

(73) Assignee: KRJ—INDÚSTRIA E COMÉRCIO LTDA, São Paulo (BR)

( * ) Notice: Subject to any disclaimer, the term of this patent is extended or adjusted under 35 U.S.C. 154(b) by 213 days.

(21) Appl. No.: 18/198,713

(22) Filed: May 17, 2023

(65) Prior Publication Data

US 2024/0388013 A1 Nov. 21, 2024

(51) Int. Cl.
*H01R 4/24* (2018.01)
*H01R 4/2408* (2018.01)
*H01R 13/03* (2006.01)

(52) U.S. Cl.
CPC ........... *H01R 4/2408* (2013.01); *H01R 13/03* (2013.01)

(58) Field of Classification Search
None
See application file for complete search history.

(56) References Cited

FOREIGN PATENT DOCUMENTS

| | | | |
|---|---|---|---|
| CN | 201699141 | U | 1/2011 |
| GB | 2266416 | A | 10/1993 |

*Primary Examiner* — Ross N Gushi
(74) *Attorney, Agent, or Firm* — Morgan, Lewis & Bockius LLP

(57) ABSTRACT

The present invention relates to electrical connectors, in addition to materials and electrical insulating apparatus. More particularly, the present invention is related to electrical piercing connectors endowed with high piercing and electrical insulating capacity, applicable to voltages over IKV. In this scenario, the present invention provides a piercing connector, comprising (i) an upper busbar assembly, (ii) a lower busbar assembly, and (iii) at least one tightening means (30, 34) of the at least one upper busbar assembly against the at least one lower busbar assembly, wherein the at least one of an upper busbar assembly and lower busbar assembly comprises a support means (16) endowed with at least one opening (18) where at least one piercing means (20) is fixed. Moreover, the present invention also innovates through the pioneer use of a thermoplastic reinforced with long fibers as electrical insulation, in particular, coating the piercing connector mentioned above.

11 Claims, 1 Drawing Sheet

PIERCING CONNECTOR

TECHNICAL FIELD

The present invention is related to electrical connectors, in addition to materials and electrical insulating apparatus. More particularly, the present invention is related to electrical piercing connectors endowed with high piercing and electrical insulating capacity.

DESCRIPTION OF THE STATE OF THE ART

Electrical connectors are broadly known in the state of the art, functioning by way of piercing busbars which pierce the insulating cover of electrical cables reaching the electricity conductor wire, making electrical contact between the conductors. Said piercing connectors can be applied both in a more controlled environment, as in installations located underground, as in less controlled environments, as in outdoor powered grids.

In general, the field of application of the piercing connectors for outdoor powered grids of the state of the art is geared towards low voltage electrical systems (up to 1 kV), which do not require a high level insulation. This guarantees the safety of the operator, as same will not be subject to electric shocks (due to the low voltage) when installing connectors on the power grid cables. The piercing connectors described in patent documents GB2266416 (A) and CN201699141 (U) are cited as examples.

Piercing connectors applicable to high voltage are generally more robust and less practical, generally requiring more than one operator for the installation thereof and/or that the network be temporarily disconnected.

Therefore, there is no knowledge of piercing connectors that can be used in outdoor, high-voltage power grids, that are easy to apply (they can be installed by just one person) and that guarantees the safety of the operator during installation. This is because the connectors of the state of the art, in general, do not comprise piercing busbars sufficiently robust to break through cables comprising thicker insulating polymers and/or do not have insulating means which at the same time are practical and efficient for the operator.

For example, many of the connectors in medium voltage protected networks are installed by mechanically withdrawing the polymer covering the conductor for applying the bare mains connector. Subsequently, the polymer mantle is applied, which resets the protected/insulated condition of this conductor, making the procedure more laborious and hazardous for the operator.

It is also known that thermoplastics reinforced with long fibers are a recent development in new technologies, where polypropylene (PP) or other thermoplastic material is combined with long glass fibers for subsequent molding. Technologies in long fiber thermoplastics are surging in the automobile industry today and they are the most important current trends in the plastics processing industry. Glass fibers measuring ½" (12 mm) up to 2" (50 mm) provide much greater stiffness, resistance and tenacity to the material than conventional short fibers measuring ⅛" (3 mm), the later having been used to reinforce thermoplastics for decades. Therefore, thermoplastics reinforced with long fibers (LFRT) have excellent mechanical properties and stiffness to weight ratio, which is of major interest to the industry in general.

However, the application and the properties of this material in electrical insulation are not known.

OBJECTIVES OF THE INVENTION

A first objective of the present invention is to provide a piercing connector that comprises a constructivity which allows same to pierce relatively thick cable insulations.

A second objective of the present invention is to provide a piercing connector that comprises a practical and safe installation for the operator.

A third objective of the present invention is to provide a piercing connector with high electrical insulation capacity, enabling same to be applied in high voltage.

These objectives and other advantages of the present invention will become clearer from the description below and the accompanying drawings.

SUMMARY OF THE INVENTION

In order to achieve the objectives described above, the present invention provides a piercing connector, comprising (i) an upper busbar assembly, (i) a lower busbar assembly, (ii) at least one tightening means; an upper counter busbar assembly; a lower busbar assembly, wherein this upper busbar assembly and lower busbar assembly comprises a support means endowed with an opening where a piercing means is fixed.

The present invention also provides for the use of a thermoplastic material reinforced with long fiber as electrical insulation and with mechanical support.

Lastly, the present invention provides a piercing connector, comprising a coating made from an electrical insulation thermoplastic material reinforced with long fiber.

DESCRIPTION OF THE DRAWINGS

The detailed description presented ahead draws reference to the accompanying drawings, wherein.

DETAILED DESCRIPTION OF THE INVENTION

The description below will start from a preferred embodiment of the invention. It will become obvious for any person skilled in the art, however, that the invention is not limited to this particular embodiment.

Figure 1:
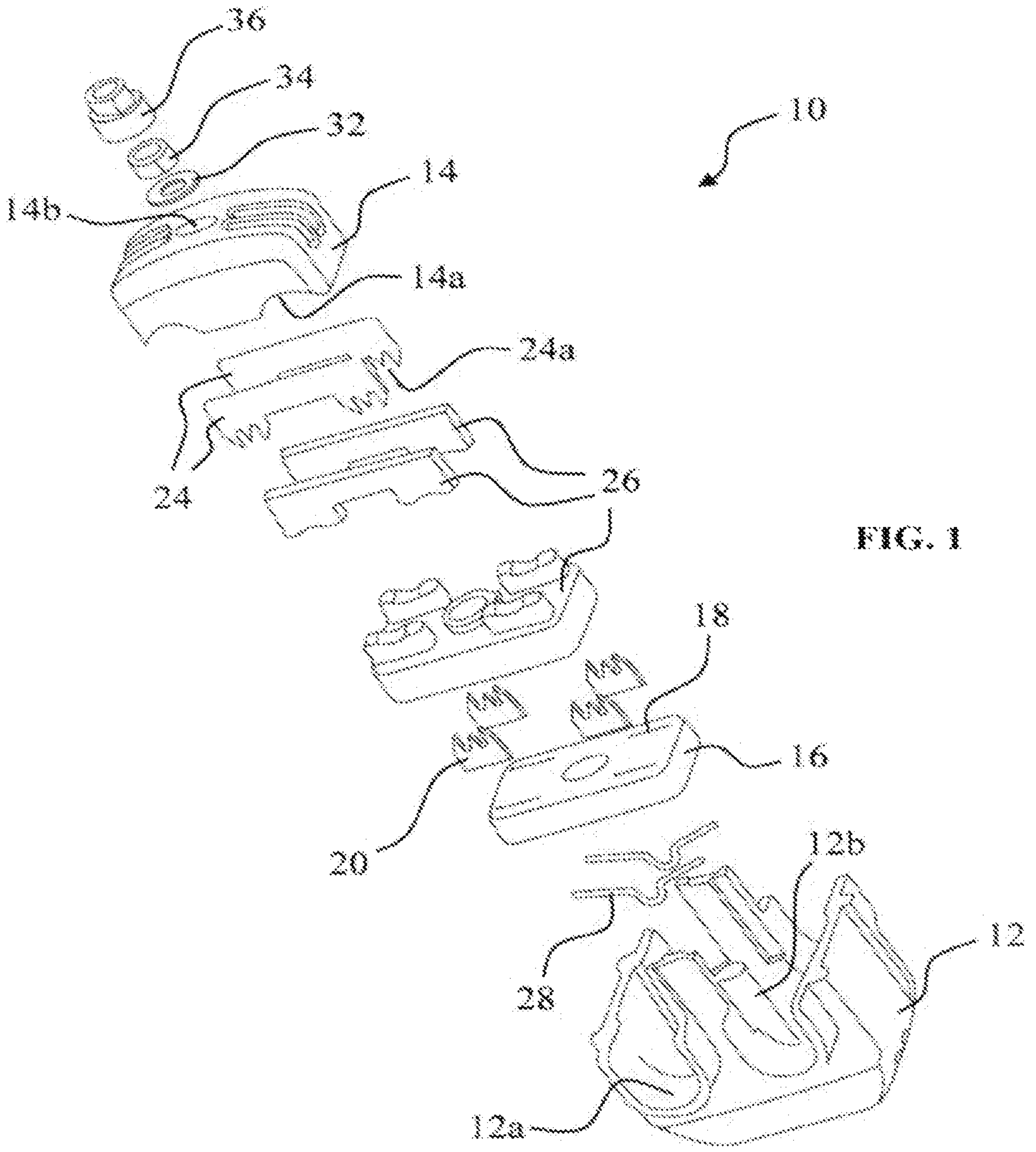
FIG. 1 shows an exploded view of the piercing connector according to the preferred embodiment of the present invention.
Figure 1:
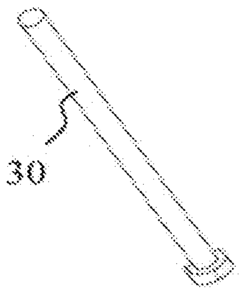

FIG. 1 illustrates the piercing connector 10 according to the present invention, comprising a set of components, preferably metal and polymer, which will be described in detail ahead.

The piercing connector 10 according to the preferred embodiment of the present invention comprises a compatible constructivity base 12 for encasing a cover 14. Both the base 10 and the cover 14 are preferably polymer, made from materials suitable for the level of electrical voltage to which said piercing connector 10 will be subjected. The greater the electrical voltage in the grid where the piercing connector 10 of the present invention will be installed, the more insulating the polymer material of the base 12 and of the cover 14 should be to guarantee the safety of the installation and of the operator.

Both the base 12 and the cover 14 comprise cavities 12*a*, 14*a* adapted to receive the network and branch cables, each on one side, which will be pierced simultaneously.

At least two busbar assemblies, namely an upper and a lower one, are disposed between the base 10 and the cover 14. At least one of the busbar assemblies, preferably the lower one, as illustrated in FIG. 1, comprises a support means 16 endowed with openings 18 where piercing means 20 are fixed. Differently to the connectors of the state of the art, where only busbars made of metal strips are used, this encasement of the piercing means 20 into openings 18 of the support means 16 guarantees, in a simple manner and at low cost, excellent stability of the piercing elements for piercing the polymer coating of thick cables (high voltage grids, for example).

Figure 2:
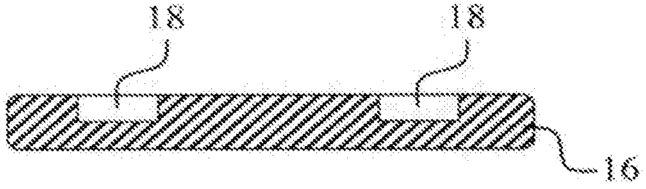
FIG. 2 shows a cutaway view of a supporting means illustrating openings contained therein.

The openings 18 penetrate the body of the support means 16 up to a given point, as illustrated in the cutaway view of FIG. 2. The more openings 18 penetrate the body of the support means 16, the greater the stability of the piercing means 20 encased therein.

Preferably, the piercing means 20 are fixed on the openings 18 by at least one cold-welding, hot-welding, refurbished, interference fit or screwing transverse to the plane of the openings 18 (not shown).

Even more preferably, the support means 16 can be made from a material endowed with high thermal conductivity, such as aluminum or copper, capable of quickly and efficiently dissipating the heat generated in the connector.

The upper busbar assembly may comprise a pair of copper strips 24, each of them having two sets of piercing upper elements 24*a* at their ends. The copper strips 24 that make up the upper busbar assembly can be housed directly in grooves of the cover 14 (not shown), if a support means 16 like in the lower busbar assembly is not used. Alternatively, the upper busbar assembly is similar to the lower busbar assembly, also comprising a support means 16.

Preferably, the contact elements of the piercing connector, namely piercing means 20 and copper strips 24, are made from a relatively resistant material with high electric conduction capacity, like a tinned copper alloy. The resistance of the contact elements for the piercing process and the quality of the electrical contact is thus guaranteed.

Preferably, so as to improve the electrical insulation of the piercing connector 10, coating elements 26 are provided for the upper and lower busbar assemblies. These coating elements 26 are preferably made from an elastic electrically insulating material, such as insulating rubber.

Further preferably, at least one resilient element 28, such as a spring, is provided between the base 12 and the support means 16, the function of which is to maintain normal power generated by the electrical contact of the contact elements 20, 24 against the cables of the network and branch conductors.

The base 12 and the cover 14 are coupled by way of a tightening means comprising, preferably, a screw 30, washer 32, nut 34 and torqueable fuse head 36, which breaks when the tightening attains the specified torque, sealing the piercing connector 10.

Preferably, the base 12 comprises a hollow cylindrical duct 12*a* through which the screw 30 passes. The cylindrical duct 12*a* may also act as guide for encasing the support means 16 at the base 12, and, in this case, the support means 16 would comprise a central hole, as illustrated in FIG. 1. Additionally, the cover 14 also comprises a hole 14*b* for the passage of the screw 30.

The present invention also provides for the innovative use of a thermoplastic material reinforced with long fibers as efficient electrical insulation.

The material used is a thermoplastic polymer comprising a resin matrix that can be at least one of polypropylene, PA, PPA, PBT and POM.

In proof tests carried out, namely thermal cycle tests with short-circuit, according to NBR 9326, and electric tracking tests, according to NBR 10296, the use of all the resins listed above demonstrated optimal performance as electrical insulation.

Preferably, the base 12 and the cover 14 piercing connector 10 according to the present invention are made of a thermoplastic material reinforced with long fibers to guarantee a high level of electrical insulation of the assembly.

Accordingly, the present invention provides a connector endowed with a high capacity of electrical insulation and of coating piercing of relatively thick cables (high voltage). Additionally, the present invention also innovates through the pioneer use of a thermoplastic reinforced with long fibers as electrical insulation, in particular, coating the piercing connector described above.

Countless variations falling within the scope of protection of the present application are permitted. Emphasis is therefore placed on the fact that the present invention is not limited to the particular configurations/embodiments described above.

The invention claimed is:

1. A piercing connector, comprising:

an upper busbar assembly;

a lower busbar assembly, wherein at least one of the upper busbar assembly and lower busbar assembly comprises a support means endowed with at least one opening where at least one piercing means is fixed;

a base encasable in a cover made from an electrical insulation thermoplastic material reinforced with long fiber;

at least one resilient means between the base and the support means, wherein the resilient means is responsible for maintaining a normal force generated by an electrical contact of contact elements against cables of network and branch conductors; and at least one tightening means of an upper busbar assembly against the lower busbar assembly.

2. The piercing connector according to claim 1, wherein at least one tightening means comprises a screw and a nut.

3. The piercing connector according to claim 2, wherein at least one tightening means additionally comprises at least one washer and torque metric nut.

4. The piercing connector according to claim 1, wherein the base and the cover comprise holes (12*b*, 14*b*) for a passage of the tightening means.

5. The piercing connector according to claim 1, wherein one of an upper busbar assembly and lower busbar assembly comprises at least one metal plate comprising piercing elements at its ends.

6. The piercing connector according to claim 1, wherein at least one of an upper busbar assembly and lower busbar assembly comprises at least one coating element made from an electrically insulating material.

7. The piercing connector according to claim 1, wherein the at least one piercing means is fastened on the at least one opening through at least one of cold-welding, hot-welding, refurbished, interference fit or screwing transversal to a plane of the at least one opening.

8. The piercing connector according to claim 1, wherein the resilient means comprises a spring.

9. The piercing connector according to claim 1, wherein the base comprises a hollow cylindrical duct.

10. The piercing connector according to claim 1, wherein the thermoplastic material comprises a resin matrix including at least one selected from the group consisting of polypropylene, PA, PPA, PBT and POM.

11. The piercing connector according to claim 1, wherein the at least one piercing means comprises contact elements made of a copper tin alloy.

* * * * *